May 14, 1935.  C. B. SEGOVIA  2,001,633
GEOGRAPHICAL CLOCK
Filed Sept. 22, 1934  2 Sheets-Sheet 1
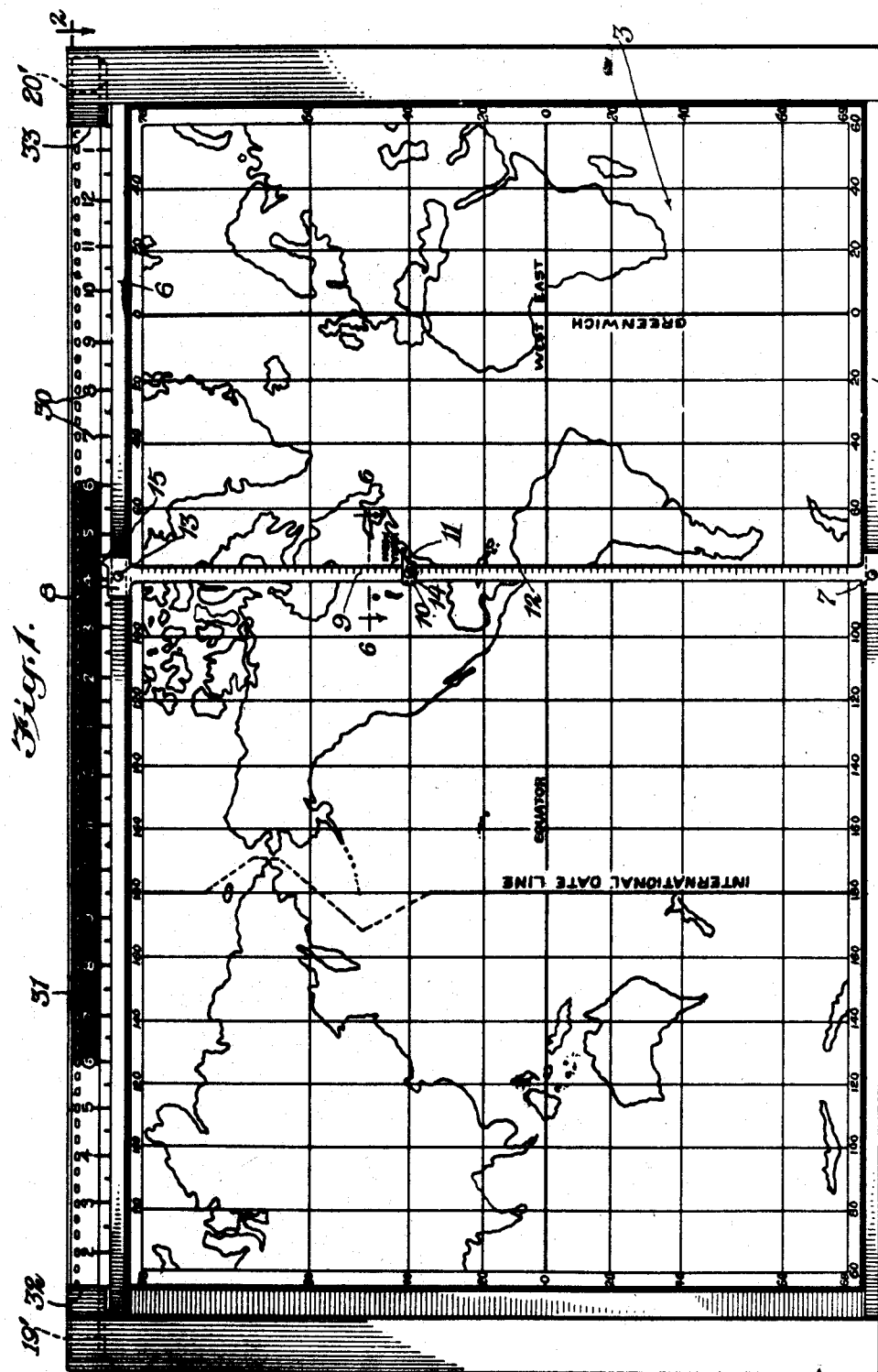
INVENTOR
Crispin B. Segovia
BY
ATTORNEYS May 14, 1935.  C. B. SEGOVIA  2,001,633
GEOGRAPHICAL CLOCK
Filed Sept. 22, 1934    2 Sheets-Sheet 2
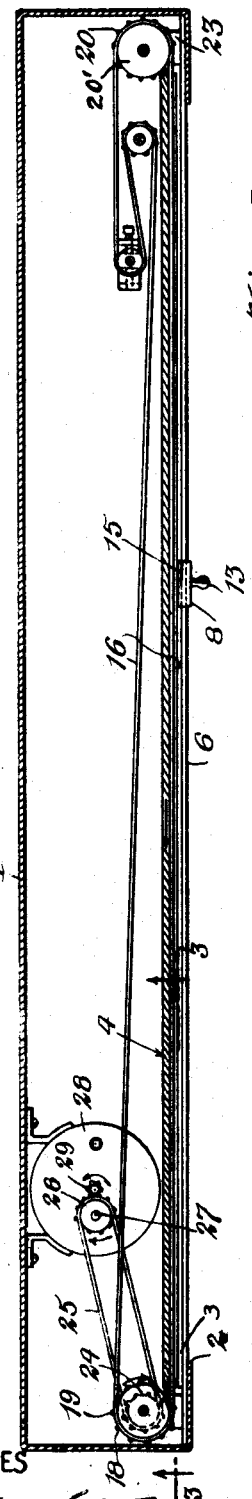
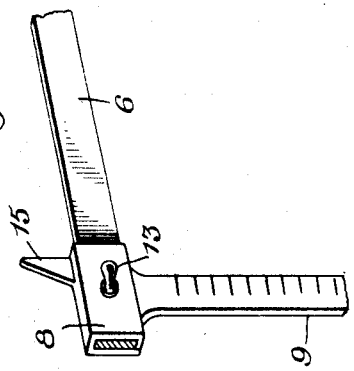
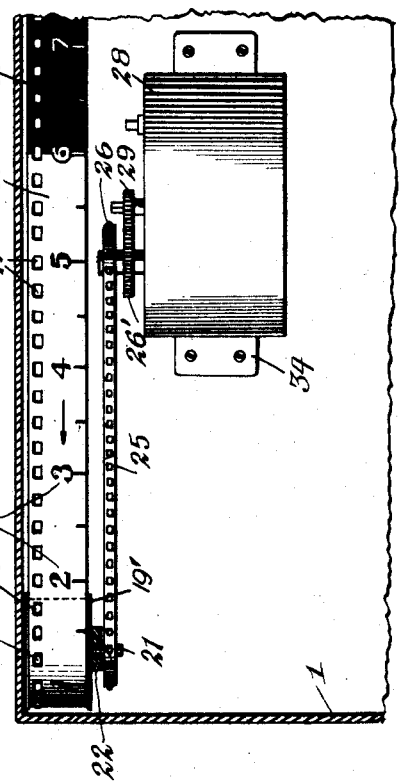
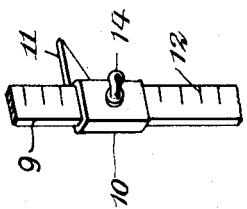
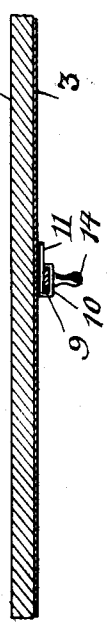
INVENTOR
Crispin B. Segovia
BY
Munn, Anderson & Liddy
ATTORNEYS Patented May 14, 1935　　　　　　　　　　　　　　　　　2,001,633

UNITED STATES PATENT OFFICE 2,001,633

GEOGRAPHICAL CLOCK

Crispin B. Segovia, New York, N. Y.

Application September 22, 1934, Serial No. 745,147

2 Claims. (Cl. 58—43)

This invention relates to horological instruments and particularly to an improved combination clock and map, the object being to provide a construction wherein the time of day or night at any place on the earth's surface may be quickly ascertained.

Another object of the present invention is to provide a horological clock, with means for constantly presenting an indication showing the time of day or night at any point on the surface of the earth.

A further object, more specifically, is to provide a geographical clock wherein there is presented a map of the world, a manually actuated sliding member adapted to be moved over the map, and a clock operated tape having indications thereon arranged at one edge of the map.

A still further and more specific object is to provide a geographical clock wherein there is presented a flat map of the world, a continuous dial having graduations thereon, day and night indications, as well as hour indications, and a clock mechanism, together with tape for moving the same at proper speed to indicate the time at all points on the map either by day or night.

In the accompanying drawings—

Figure 1 is a plan view of a geographical clock disclosing an embodiment of the invention;

Figure 1A is a plan view on a reduced scale of the entire belt shown in Figure 1;

Figure 2 is a sectional view through Figure 1 approximately on the line 2—2;

Figure 3 is an enlarged fragmentary sectional view through Figure 2 on the line 3—3;

Figure 4 is an enlarged fragmentary perspective view of an indicating bar and certain associated parts;

Figure 5 is a perspective view of the central part of the bar shown in Figure 4, with a sliding pointer mounted thereon;

Figure 6 in an enlarged fragmentary sectional view through Figure 1, approximately on the line 6—6.

Referring to the accompanying drawings by numeral, 1 indicates a casing of any desired kind for enclosing certain parts of the device, said casing having an open face as indicated at 2 so as to expose the map 3 which is secured by adhesive or otherwise to a suitable back board 4 carried by the casing 1 in any desired manner. At the top and bottom of the opening 2 there are provided rails 5 and 6 for accommodating the tubular portions 7 and 8 of the slide bar 9. On the slide bar 9 is arranged a short sleeve 10 having a pointer 11 adapted to be moved to a desired position for indicating the location of a ship, city or other point. The slide bar 9 is provided with a number of graduations 12 which may be degrees or parts of degrees as preferred. A knob 14 is arranged on the sleeve 10, and a knob 13 on the sleeve 8, whereby these members may be readily slid back and forth as desired.

From Figure 4 it will be noted that the sleeve or tubular member 8 is provided with a pointer 15 adapted to travel over the tape 16. The belt or tape 16 may be made from paper, cloth, a combination of these materials, metal or any other desired material, and is provided with apertures 17 whereby it may fit the teeth 18 of the respective sprockets 19 and 20. These sprockets merge into the tubular portions 19' and 20', so as to present supporting and guiding pulleys for the strip as it is moved by the sprocket wheels. A shaft 21 for each of these sprocket wheels is provided and carried by the respective support brackets 22 and 23. A comparatively small sprocket wheel 24 is secured to the sprocket 19 so as to accommodate the sprocket chain 25 which passes over the sprocket wheel 26 pivotally supported by the shaft 27, which shaft may be carried by the back wall of the clock 28 or by any other suitable support.

The sprocket wheel 26 is rigidly secured in any desired manner to the gear wheel 26' (Fig. 3), and this gear wheel meshes continually with the pinion or the small gear wheel 29, which latter gear wheel or pinion is connected to the mechanism of the clock 28, as, for instance, to the hour shaft thereon. However, it will be evident that the pinion 29 might be connected to the minute shaft or to some other shaft of the clock 28 so as to be operated by the clock's mechanism at a constant speed. It will also be understood that the various parts just described are properly proportioned so that when the pointer 15 on bar 9 is stationary, the various numbers 30 on belt 16 will pass the pointer at intervals of one hour.

As illustrated in the drawings, the belt or tape 16 is of a length to show the hours for three days, but through the opening 2 the hours for only one day are disclosed. As illustrated particularly in Fig. 1, the dark portion 31 indicates night time under all conditions, and as illustrated the belt or tape 16 moves to the left so that, as shown in Fig. 1, it is about 4.30 A. M. in New York. As the dark zone 31 begins to pass the point 32, another dark zone begins to emerge from behind point 33. The belt 16 is provided with graduations and other indications for three days, but it is evident that a longer belt could be used without departing from the spirit of the invention, namely, a belt having proper indications for four or five days, though a belt for two days would not be practical. If desired the belt could be made from celluloid similar to the belts commonly used in moving picture machines, so that the various apertures 17 may be properly formed.

As shown in Fig. 2 the chain 25 passes over the sprocket wheel 26 which is rigidly connected to the gear wheel 26', which gear wheel in turn meshes with the pinion or small gear wheel 29 as above mentioned. The gear wheel 29 is connected to the mechanism of the clock 28, and the gear wheel 26' is carried by the casing of the clock, so that when the clock is secured by suitable sprockets 34 to the casing or housing 1, all the parts will be held in proper position for functioning accurately. The clock 28 may be an ordinary spring clock, electric clock or some other form of clock without departing from the spirit of the invention, but it must be of a size to have sufficient power to move the various parts as mentioned. The parts are compartively small and light and consequently a small amount of power is all that is necessary, but this power must be enough to cause the parts to move at constant speed day and night.

As illustrated in Fig. 1 the map 3 is a flat map of the world and may be provided with the necessary details such as indications of cities, paths for ocean going ships, and the like. When the clock is in ordinary use the bar 9 is merely left in any desired place and the belt 16 continues to move at all times. The bar 9 may be moved at any time in order to secure the time of day or night at any point on the earth's surface, the same being reckoned from a given point as, for instance, the Greenwich line. As shown in the drawings, New York is a certain distance west of Greenwich and consequently when the pointer 11 is moved to the dot on the map indicating New York, the pointer 15 will indicate the time of day at New York. If the bar 9 was then moved quickly over so that the pointer 11 pointed at Greenwich, the pointer 15 would indicate the time at Greenwich, namely 9.30. If the pointer 11 was then quickly moved over to the Hawaiian Islands the pointer 15 would indicate the time at these islands, which as shown on the drawings would be 11 P. M.

By reason of this construction a person in New York can tell the time of day or night at any place on the globe and, consequently, will know whether is is possible to telephone to any distant point with hopes of finding the desired party near the telephone. As an example, if someone in London, England, wishes to telephone to a person in New York, and it was 9 A. M. in London, the English party could move the bar 9 until the pointer indicated New York, which would show that it was then 4 A. M. in New York. Consequently the English party would defer telephoning to New York until such time as he knew the New York party would be ready to receive his message. In locating ships on the ocean the same idea may be carried out.

I claim:—

1. A geographical clock including a housing having an opening in one face, a board positioned in the housing and supported near the front thereof, a flat map of the world carried by said board and exposed through said opening, a top bar extending across said opening at the upper edge of said map, a bottom bar extending across said opening at the bottom of said map, a slide bar connecting the top and bottom bars, said slide bar at the respective ends having encircling structures for loosely encircling said top and bottom bars whereby said slide bar may freely slide back and forth over said map, a pointer slidingly mounted on said slide bar, a pointer carried by the slide bar at the upper end and projecting above said top bar, an endless tape positioned to travel across said opening immediately above said top bar, said last mentioned pointer projecting over the tape, said tape having sets of numbers and graduations indicating hours and parts of hours of several days, twenty-four hours being disclosed in said opening at all times, and clock mechanism connected with said tape for driving the same at the proper speed.

2. A geographical clock including a housing having an opening in one face, a map of the world carried by the housing and exposed through said opening, a top bar extending across said housing adjacent the upper end of said map, a bottom bar extending across said housing adjacent the bottom of said map, a slide bar slidingly mounted by said top and bottom bars so that said slide bar may freely slide back and forth over said map, a pointer slidingly mounted on said slide bar, a pointer carried by said slide bar at the upper end, an endless tape positioned to travel across said opening and near said last-mentioned pointer, said tape having sets of number and graduations indicating hours and parts of hours of several days, twenty-four hours being disclosed in said opening at all times, and clock mechanism connected with said tape for driving the same at the proper speed.

CRISPIN B. SEGOVIA.